(12) United States Patent
Nagasawa

(10) Patent No.: US 12,454,236 B2
(45) Date of Patent: Oct. 28, 2025

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 623 days.

(21) Appl. No.: 17/692,404

(22) Filed: Mar. 11, 2022

(65) Prior Publication Data

US 2022/0306025 A1 Sep. 29, 2022

(30) Foreign Application Priority Data

Mar. 29, 2021 (JP) ................................ 2021-054746

(51) Int. Cl.
*B60R 19/20* (2006.01)
*B60R 21/0134* (2006.01)
(Continued)

(52) U.S. Cl.
CPC ........ *B60R 19/205* (2013.01); *B60R 21/0134* (2013.01); *B60R 21/2165* (2013.01);
(Continued)

(58) Field of Classification Search
CPC ... B60R 19/205; B60R 21/0134; B60R 21/36; B60R 2021/0004; B60R 2021/01013;
(Continued)

(56) References Cited

U.S. PATENT DOCUMENTS

| | | | | |
|---|---|---|---|---|
| 8,297,651 B2 * | 10/2012 | Kwon | ................. | B60R 21/0136 |
| | | | | 180/274 |
| 11,299,145 B2 * | 4/2022 | Kim | ................. | B60W 30/0956 |

(Continued)

FOREIGN PATENT DOCUMENTS

| | | | | |
|---|---|---|---|---|
| CN | 104648292 A | * | 5/2015 | ............. B60R 19/20 |
| DE | 102005012719 A1 | | 9/2006 | |

(Continued)

OTHER PUBLICATIONS

Japanese Office Action dated Jan. 7, 2025 in JP2021-054746, and English translation thereof.

*Primary Examiner* — Joseph D. Pape
(74) *Attorney, Agent, or Firm* — McGinn I.P.Law Group, PLLC

(57) ABSTRACT

An airbag apparatus includes an airbag configured to be deployed forward of a front of a vehicle body of a vehicle, a collision determiner configured to establish a pre-crash determination when a collision probability is a predetermined threshold or higher, an airbag deployment controller configured to, in response to the pre-crash determination, give to an inflator a command to supply deployment gas to the airbag and deploy the airbag, a vent controller configured to open and close a vent passage configured to discharge the deployment gas from the airbag, and an energy absorption state detector configured to detect a state of energy absorption by the airbag. The vent controller is configured to open the vent passage at an early stage of collision with a collision object, and subsequently, reduce an opening degree of the vent passage when the energy absorption state detector detects a completion of energy absorption.

20 Claims, 7 Drawing Sheets

(51) Int. Cl.
  *B60R 21/2165*  (2011.01)
  *B60R 21/36*  (2011.01)
  *B60R 21/00*  (2006.01)
  *B60R 21/01*  (2006.01)

(52) U.S. Cl.
  CPC ...... *B60R 21/36* (2013.01); *B60R 2021/0004* (2013.01); *B60R 2021/01013* (2013.01)

(58) Field of Classification Search
  CPC ............ B60R 2021/2395; B60R 19/20; B60R 21/0132; B60R 21/2165–2171; B60R 21/2395
  USPC ................................ 293/107; 280/730.2, 274
  See application file for complete search history.

(56) References Cited

U.S. PATENT DOCUMENTS

| | | | |
|---|---|---|---|
| 2004/0169362 A1* | 9/2004 | Hammer | B60R 21/36 |
| | | | 280/751 |
| 2005/0087998 A1 | 4/2005 | Curry et al. | |
| 2006/0043712 A1* | 3/2006 | Hakki | B60R 21/36 |
| | | | 280/735 |
| 2009/0102167 A1 | 4/2009 | Kitte et al. | |
| 2011/0018237 A1 | 1/2011 | Choi et al. | |
| 2012/0267183 A1 | 10/2012 | Wilmot et al. | |
| 2019/0283765 A1* | 9/2019 | Koti | B60W 20/12 |
| 2020/0047709 A1 | 2/2020 | Gunji et al. | |
| 2020/0156533 A1* | 5/2020 | Lee | B60Q 1/507 |
| 2022/0185220 A1* | 6/2022 | Gould | B60R 21/205 |
| 2022/0306038 A1* | 9/2022 | Perez | B60R 21/2338 |

FOREIGN PATENT DOCUMENTS

| | | | | |
|---|---|---|---|---|
| JP | 2006273262 A | 10/2006 | | |
| JP | 2007-216933 A | 8/2007 | | |
| JP | 2007269169 A | 10/2007 | | |
| JP | 2009101793 A | 5/2009 | | |
| JP | 2009190605 A | 8/2009 | | |
| JP | 2011-218857 A | 11/2011 | | |
| JP | 2012229014 A | 11/2012 | | |
| JP | 2016078762 A | 5/2016 | | |
| JP | 2017087767 A * | 5/2017 | ........... | B60R 21/205 |
| JP | 2020015331 A | 1/2020 | | |
| JP | 2020-023281 A | 2/2020 | | |
| WO | WO-2006081218 A2 * | 8/2006 | ........... | B60R 19/205 |
| WO | 2018173514 A1 | 9/2018 | | |
| WO | WO-2019088028 A1 * | 5/2019 | ......... | B60R 21/0136 |

* cited by examiner

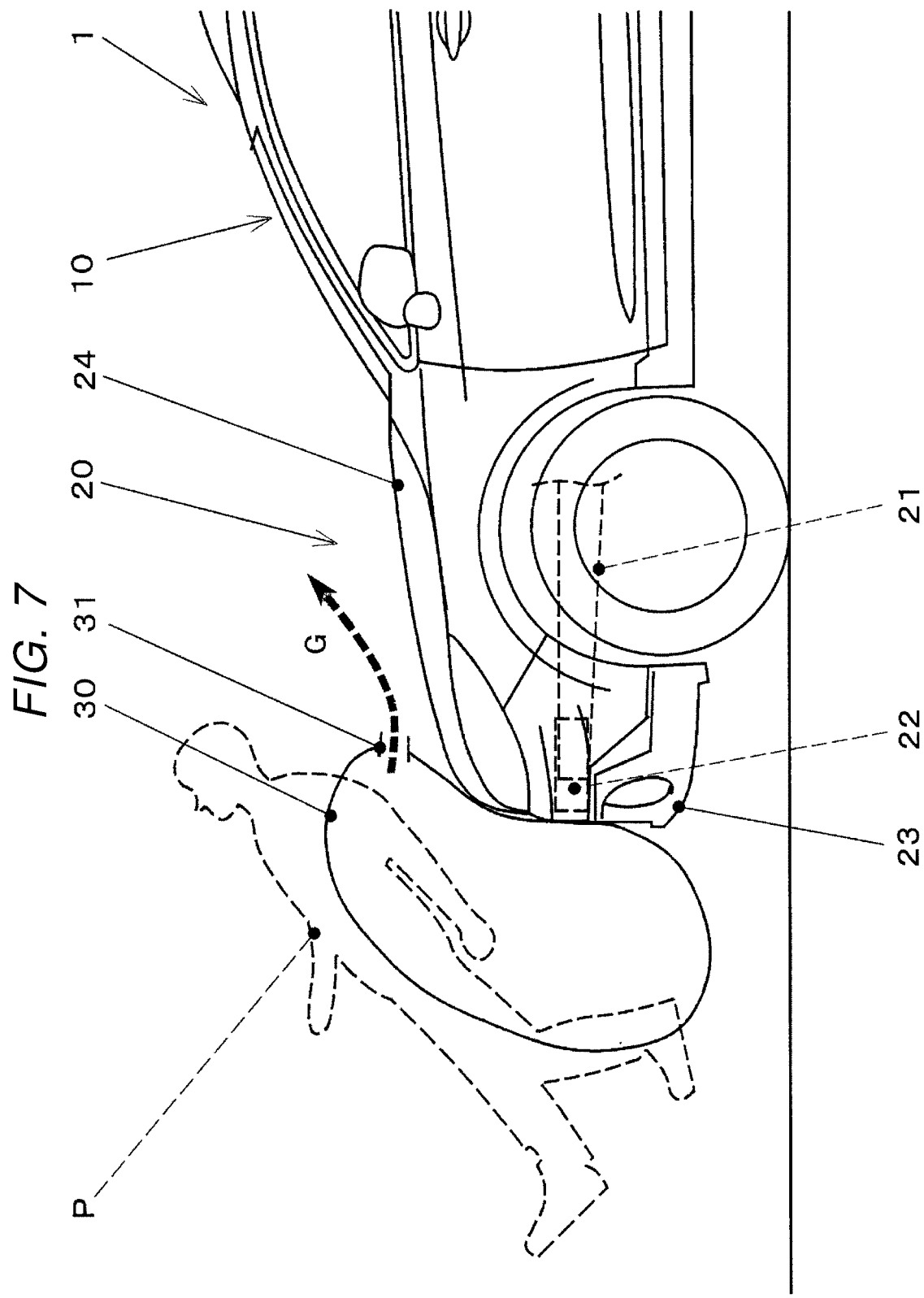

AIRBAG APPARATUS

CROSS-REFERENCE TO RELATED APPLICATIONS

The present application claims priority from Japanese Patent Application No. 2021-054746 filed on Mar. 29, 2021, the entire contents of which are hereby incorporated by reference.

BACKGROUND

The disclosure relates to an airbag apparatus including an airbag deployable outward from a vehicle body front of a vehicle such as an automobile.

Concerning a vehicle such as an automobile, it has been proposed to use an airbag deployable out of the vehicle so as to prevent injury to a pedestrian or the like during a collision.

As a technique regarding such an external airbag apparatus, for example, Japanese Unexamined Patent Application Publication (JP-A) No. 2011-218857 discloses that an airbag for bicyclist protection is controlled to cause the airbag to come into contact with a bicyclist at such a height that the height and a height of a collision position are symmetrical with respect to an estimated center of gravity of the bicyclist so as to prevent the bicyclist from being sent flying or knocked down by the airbag collided with.

JP-A No. 2007-216933 discloses an airbag apparatus for pedestrian protection including a plurality of protection bags and a control bag. The protection bags are disposed on a front edge of a vehicle body in a vehicle width direction. The control bag couples the protection bags and controls an inclination of an adjacent pair of the protection bags. The plurality of protection bags are deployed to surround a pedestrian.

JP-A No. 2020-023281 discloses a vehicular protection apparatus for pedestrian protection that raises a hood upon a collision, deploys an airbag forward of a vehicle body, and projects a face lower (a lower end portion of a front bumper face, i.e., an air dam) forward to turn a pedestrian onto the hood.

SUMMARY

An aspect of the disclosure provides an airbag apparatus to be applied to a vehicle. The airbag apparatus includes an airbag, a collision determiner, an airbag deployment controller, a vent controller, and an energy absorption state detector. The airbag is configured to be deployed forward of a front of a vehicle body of the vehicle. The collision determiner is configured to establish a pre-crash determination in a case where a collision probability is equal to or higher than a predetermined threshold. The airbag deployment controller is configured to, in response to the pre-crash determination, give to an inflator a command to supply deployment gas to the airbag and deploy the airbag. The vent controller is configured to open and close a vent passage configured to discharge the deployment gas from the airbag. The energy absorption state detector is configured to detect a state of energy absorption by the airbag. The vent controller is configured to open the vent passage at an early stage of collision with a collision object, and subsequently, reduce an opening degree of the vent passage in a case where the energy absorption state detector detects a completion of predetermined energy absorption.

An aspect of the disclosure provides an airbag apparatus to be applied to a vehicle. The airbag apparatus includes an airbag and circuitry. The airbag is configured to be deployed forward of a front of a vehicle body of the vehicle. The circuitry is configured to establish a pre-crash determination in a case where a collision probability is equal to or higher than a predetermined threshold. The circuitry is configured to, based on the pre-crash determination, give to an inflator a command to supply deployment gas to the airbag and deploy the airbag. The circuitry is configured to open and close a vent passage configured to discharge the deployment gas from the airbag. The circuitry is configured to detect a state of energy absorption by the airbag. The circuitry is configured to open the vent passage at an early stage of collision with a collision object, and subsequently, reduce an opening degree of the vent passage upon detecting a completion of predetermined energy absorption.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 1 illustrates a state of a vehicle at the time of airbag deployment, as viewed from above.

FIG. 7 is a diagram illustrating a state after a vehicle including the airbag apparatus according to the embodiment has collided with a pedestrian, and a relative speed of the pedestrian and a vehicle body has become equal to or less than a predetermined threshold.

DETAILED DESCRIPTION

Concerning a collision of a vehicle with a pedestrian or a bicyclist (hereinafter referred to as a "pedestrian or the like"), there has been a demand for preventing injury to the pedestrian or the like.

It is desirable to provide an airbag apparatus that can prevent injury to a pedestrian or the like.

In the following, an airbag apparatus according to an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The airbag apparatus according to the embodiment is disposed, for example, on a front of a vehicle body of an automobile such as a passenger vehicle so as to mainly protect (reduce injuriousness to) a human body of a pedestrian, a bicyclist or the like with whom the automobile has collided.

Figure 1:
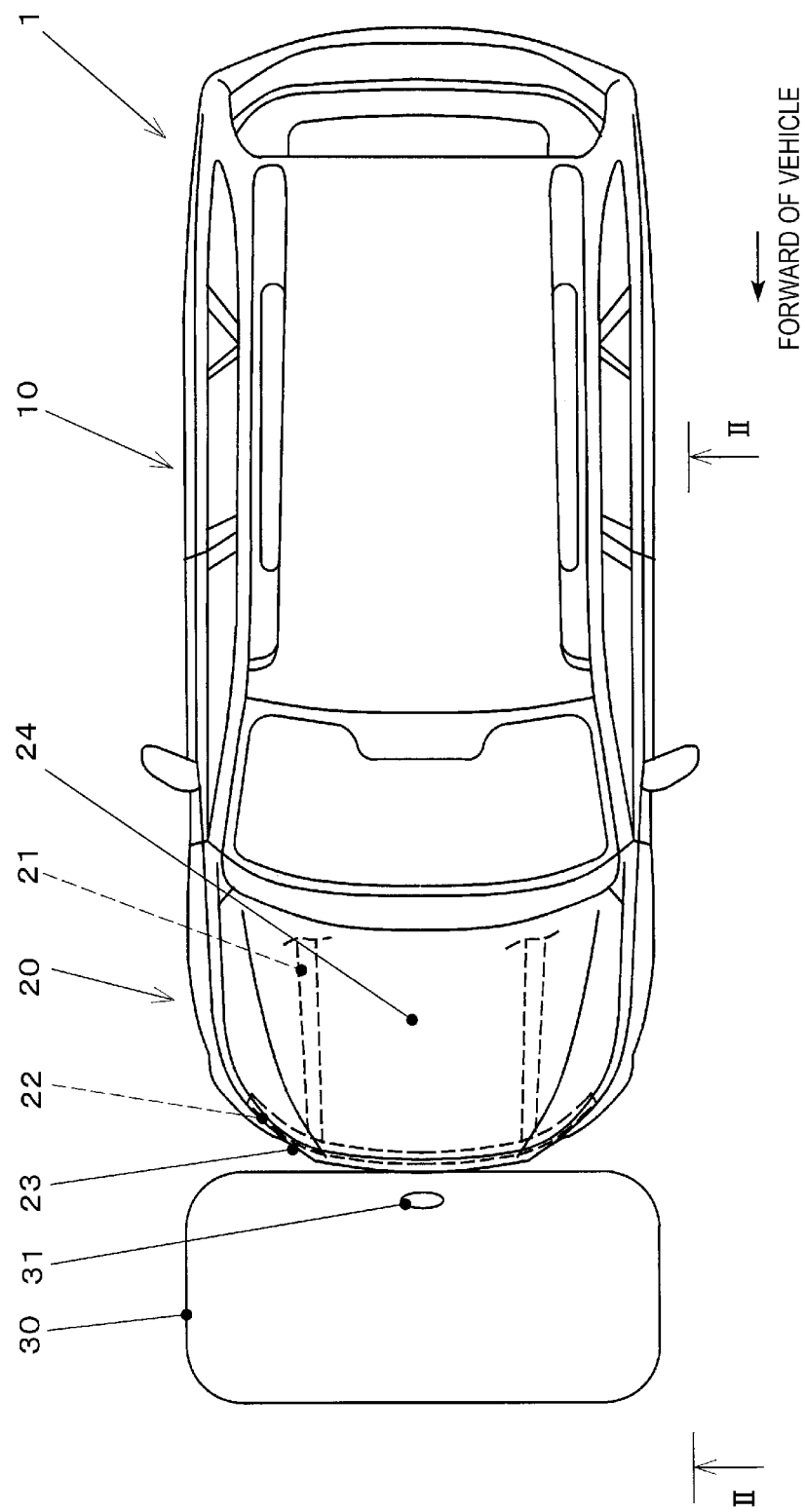
FIG. 1 is a diagram schematically illustrating a configuration of an airbag apparatus according to an embodiment of the disclosure.

FIG. 1 is a diagram schematically illustrating a configuration of the airbag apparatus according to the embodiment. FIG. 1 illustrates a state of a vehicle at the time of airbag deployment, as viewed from above.

Figure 2:
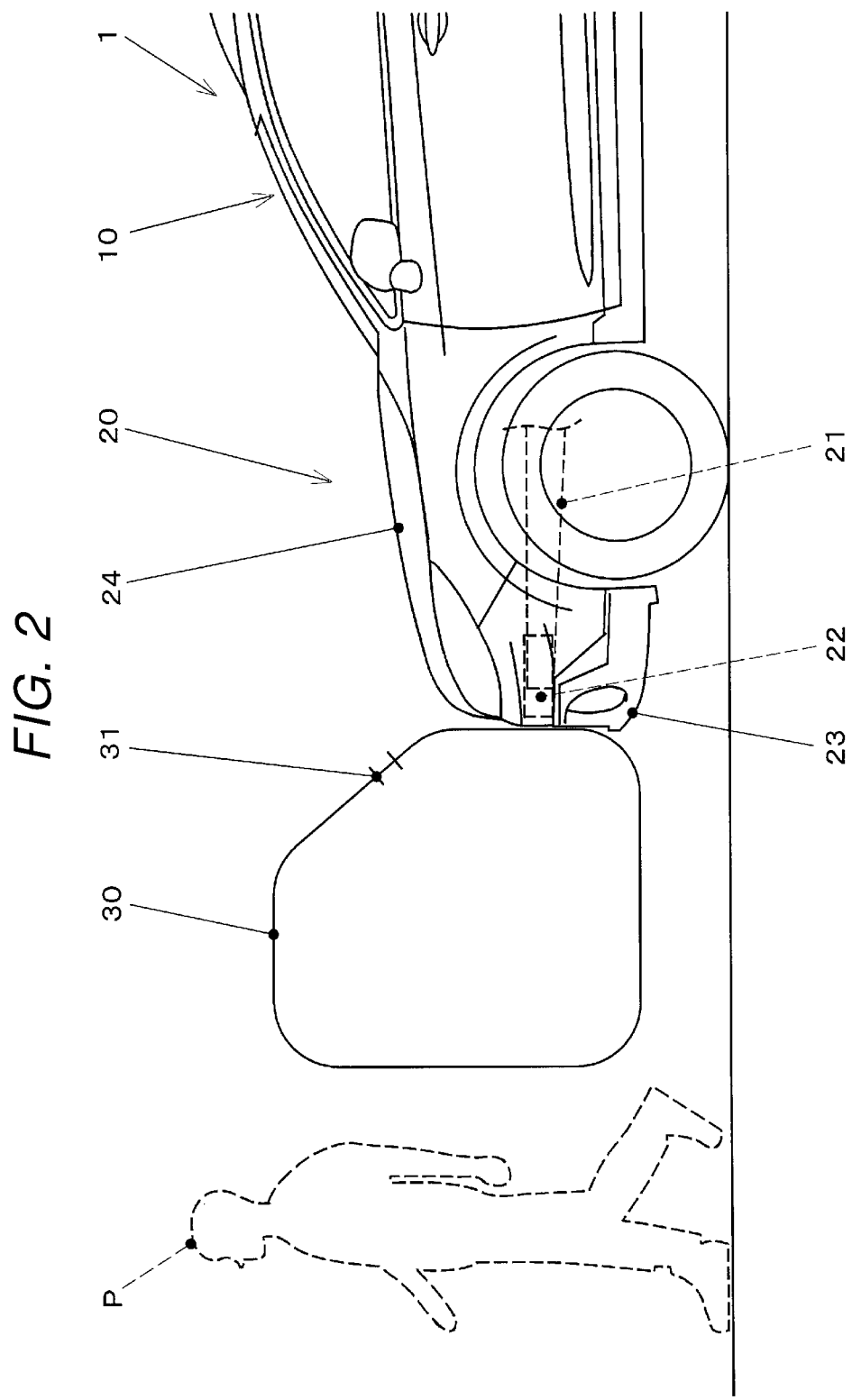
FIG. 2 is a partial diagram of FIG. 1 as viewed in a direction indicated by arrows II.

FIG. 2 is a partial diagram of FIG. 1 as viewed in a direction indicated by arrows II.

The vehicle 1 has, for example, a so-called two-box vehicle shape including an engine compartment 20 that protrudes forward from a vehicle cabin 10.

The vehicle cabin 10 has a space containing an occupant, for example.

The engine compartment 20 has a space containing power train components such as an engine, a transmission, a motor-generator in the case of an electric vehicle, and control units for these components.

The engine compartment 20 includes front side frames 21, a bumper beam 22, a front bumper 23, a front hood 24, and other components.

The front side frames 21 are structural members protruding toward the front of the vehicle from a toeboard, not illustrated, which is a partition wall disposed on a front end of the vehicle cabin 10.

The front side frames 21 serve, for example, as cross members where a power train and a front suspension are attached, and as a base portion where a component such as a strut housing containing struts of a MacPherson-strut front suspension is attached.

For example, a steel plate is molded into components by presswork, and the components are gathered and welded into the front side frames 21. Thus, the front side frames 21 each have a closed rectangular cross-sectional shape as viewed from a vehicle fore-and-aft direction.

The bumper beam 22 is a structural member disposed on the vehicle body front and extending in a vehicle width direction.

For example, a steel plate is molded into components by presswork, and the components are gathered and welded into the bumper beam 22 or the bumper beam 22 is made of an extruded material of aluminum alloy. Thus, the bumper beam 22 is a beam-shape member having a closed cross-sectional shape.

An intermediate portion of the bumper beam 22 is coupled to front ends of the left and right front side frames 21.

Both ends of the bumper beam 22 in the vehicle width direction protrude outward in the vehicle width direction from the front side frames 21.

The bumper beam 22 is a load transmission member by which a load that an airbag 30, described later, receives from a human body or object collided with is transmitted to a rear side of the vehicle body via the front side frames 21.

The front bumper 23 is an exterior member disposed on a front end of the vehicle body, and includes a bumper face that is made of a material such as PP resin and that constitutes a skin. The bumper face is attached to the vehicle body with brackets, not illustrated, for example.

A front surface of the front bumper 23 is curved in such a manner that the vehicle front is convex when the vehicle 1 is viewed from above.

The bumper beam 22 has such an arcuate shape that the vehicle front is convex along a curve of the front surface of the front bumper 23 when the vehicle 1 is viewed from above.

The front hood 24 is an openable lid member covering an upper portion of the engine compartment 20.

The front hood 24 includes a panel of mild steel or aluminum alloy, for example, formed by presswork, and a frame-shaped stiffening structure disposed on a rear surface (lower surface) of the panel.

When a pedestrian or the like that has collided with the vehicle 1 collides against an upper surface of the front hood 24, the front hood 24 serves to absorb energy by plastic deformation so as to prevent injury.

The airbag apparatus according to the embodiment includes the airbag 30 described below.

The airbag 30 is formed in a bag shape by bonding panels of base cloth such as nylon 66 woven fabric.

When a pre-crash determination, described later, is established, deployment gas generated by an inflator 111 is introduced into the airbag 30, and the airbag 30 is deployed and further expanded.

In normal operation (before a pre-crash determination is established), the airbag 30 in a folded state is contained inside the front bumper 23.

Upon a collision, the airbag 30 ruptures a fragile portion of the front bumper 23 and is unfolded forward of the vehicle and deployed forward of the front surface of the front bumper 23.

The airbag 30 has a vent hole 31.

The vent hole 31 is a vent passage via which deployment gas G is discharged out of the airbag 30.

An opening degree of the vent hole 31 is controllable by a vent control valve 112, described later.

Figure 3:
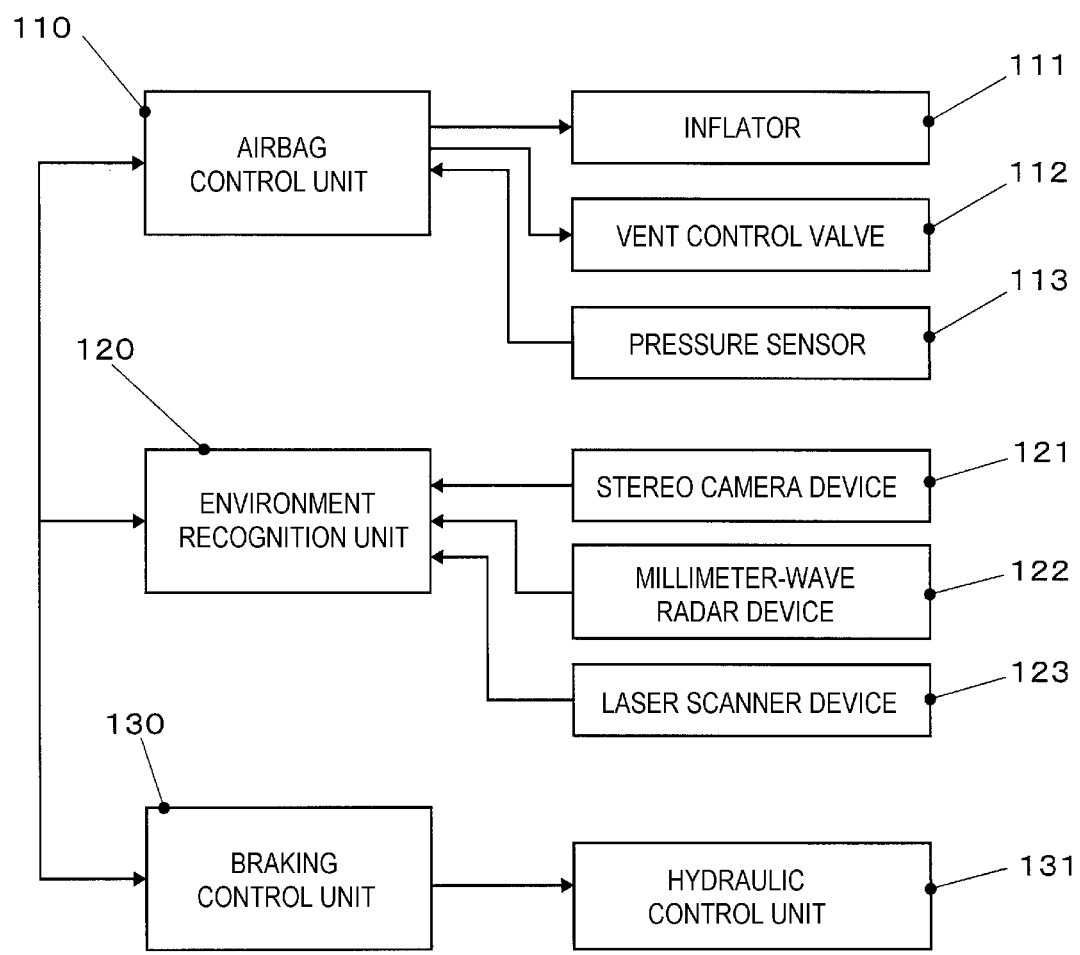
FIG. 3 is a block diagram schematically illustrating a configuration of a system to control the airbag apparatus according to the embodiment.

FIG. 3 is a block diagram schematically illustrating a configuration of a system to control the airbag apparatus according to the embodiment.

The system to control the airbag apparatus includes components such as an airbag control unit 110, an environment recognition unit 120, and a braking control unit 130.

Each of these units may be provided as, for example, a microcomputer including an information processor such as a CPU, storages such as a RAM and a ROM, an input/output interface, and buses to couple these components to one another.

The units are connected via in-vehicle LAN such as a CAN communication system or directly and are mutually communicable.

The airbag control unit 110 commands and controls the inflator 111 and the vent control valve 112 so as to deploy the airbag 30 and also to control a deployment state.

In one embodiment, the airbag control unit 110 may serve as an "airbag deployment controller".

The inflator 111 is a chemical (explosive) gas generation device to generate the deployment gas G to deploy the airbag 30 in response to a command from the airbag control unit 110.

The inflator 111 is a so-called multi-stage inflator capable of generating the deployment gas G a plurality of times in response to a command from the airbag control unit 110.

In response to a command from the airbag control unit 110, the vent control valve 112 opens and closes the vent hole 31 to discharge the deployment gas G from the airbag 30 (e.g., release gas to the atmosphere).

The vent control valve 112 may include an electromagnetic valve, for example.

The vent control valve 112 serves to continuously or stepwise change the opening degree of the vent hole 31 in response to a command from the airbag control unit 110.

In one embodiment, the airbag control unit 110 and the vent control valve 112 in cooperation with each other may serve as a "vent controller".

The airbag control unit 110 is provided with a pressure sensor 113.

The pressure sensor 113 serves to detect a pressure of the deployment gas G inside (internal pressure) of the airbag 30.

Based on an output from the pressure sensor 113, the airbag control unit 110 can detect an input state of the load on the airbag 30 and an absorption state of collision energy.

In one embodiment, the airbag control unit 110 in cooperation with the pressure sensor 113 may serve as an "energy absorption state detector".

The environment recognition unit 120 recognizes an environment around the host vehicle based on outputs from various sensors.

The environment recognition unit 120 serves to recognize, for example, human bodies of pedestrians, bicyclists, or the like, various objects such as other vehicles, buildings, trees, and geographical features, and road shapes (lane shapes) in the vicinity of the vehicle 1 (host vehicle).

When a collision with a human body of a pedestrian, a bicyclist, a motorcyclist, or the like, or with an object other than a human body, such as another vehicle, is unavoidable (when a collision probability is a predetermined value or higher), the environment recognition unit 120 establishes a pre-crash determination. In one embodiment, the environment recognition unit 120 may serve as a "collision determiner".

Components such as a stereo camera device 121, a millimeter-wave radar device 122, and a laser scanner device 123 are coupled to the environment recognition unit 120.

The stereo camera device 121 includes a pair of cameras disposed at a predetermined interval (base line length), and serves to recognize human bodies of pedestrians, bicyclists, or the like, and objects such as other vehicles and buildings. The stereo camera device 121 also serves to detect a position of each of the human bodies, objects, or the like relative to the vehicle 1 using known stereo image processing.

The stereo camera device 121 serves to recognize attributes of a subject or object by, for example, pattern recognition of a captured image.

For example, in the case of a human body of a pedestrian or the like, the stereo camera device 121 serves to recognize attributes such as a build, presumed weight, and posture of the human body.

The stereo camera device 121 monitors a change of positions of a collision object (pedestrian or the like) relative to the vehicle 1 and detects a speed of the collision object relative to the vehicle body. In one embodiment, the stereo camera device 121 may serve as a "relative speed detector".

The millimeter-wave radar device 122 uses radio waves in a frequency band of 30 to 300 GHz, for example, and serves to detect presence of a human body, an object, or the like, and positions of the human body, the object, or the like relative to the vehicle 1.

The laser scanner device (LIDAR) 123 irradiates and scans the vehicle 1 and its vicinity with a near-infrared laser beam in a pulse shape, for example. Based on presence of reflected light and time lags until the reflected light returns, the laser scanner device 123 serves to detect presence of a human body, an object, or the like, positions of the human body, the object, or the like relative to the vehicle 1, and shapes of the human body, the object, or the like.

When a collision with a human body of a pedestrian or the like, or an object such as another vehicle is unavoidable (when a pre-crash determination is established), for example, the environment recognition unit 120 is capable of recognizing a collision mode with the human body, the object, or the like (e.g., a speed vector of the other party of the collision with respect to the vehicle 1, and a collision position relative to the vehicle 1), and attributes of the other party of the collision (e.g., a build of the human body and a model of the other vehicle).

The braking control unit 130 controls a braking force of a hydraulic service brake disposed on each wheel of the vehicle 1.

A hydraulic control unit 131 is coupled to the braking control unit 130.

The hydraulic control unit 131 serves to individually control a wheel cylinder hydraulic pressure that generates a braking force of each wheel.

The hydraulic control unit 131 includes, for example, an electric pump to pressurize a brake fluid, and electromagnetic valves, such as a booster valve, a pressure reduction valve, and a pressure maintaining valve, to control a hydraulic pressure of each wheel cylinder.

The braking control unit 130 serves to perform, for example, anti-lock brake control and behavior control. The anti-lock brake control is to periodically reduce a wheel cylinder hydraulic pressure of a wheel locked at the time of brake locking so as to recover rotation of the wheel. The behavior control when an understeer behavior or an oversteer behavior occurs is to cause left and right wheels to have a braking force difference so as to generate yaw moment to restrain each of the behaviors.

When the environment recognition unit 120 establishes a pre-crash determination, the braking control unit 130 serves to automatically generate a braking force and decelerate the vehicle 1 so as to relieve collision injury.

Next, an operation of the airbag apparatus according to the embodiment will be described.

Figure 4:
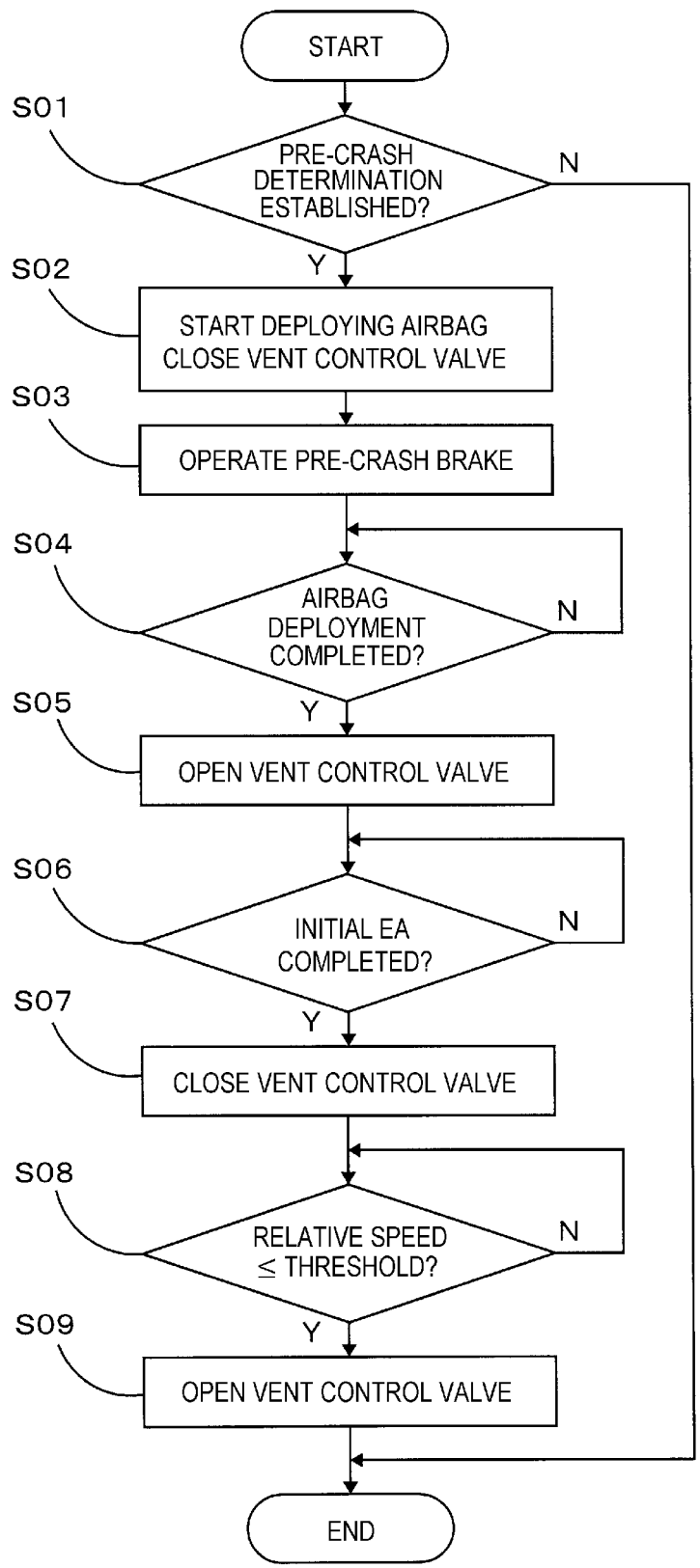
FIG. 4 is a flowchart of an operation of the airbag apparatus according to the embodiment in the event of a collision.

FIG. 4 is a flowchart of an operation of the airbag apparatus according to the embodiment in the event of a collision.

The operation will now be described step by step.

Step S01: Pre-Crash Determination

Using known pre-crash determination logic, the environment recognition unit 120 estimates a probability of occurrence of a collision between the vehicle 1 and a collision object such as a pedestrian and a bicyclist approaching from ahead of the vehicle 1, and determines whether the estimated probability is equal to or higher than a preset threshold.

When the probability of occurrence of the collision is equal to or higher than the threshold, the environment recognition unit 120 regards the collision as unavoidable and establishes a pre-crash determination. Then, the process proceeds to step S02. Otherwise, the process ends.

Step S02: Start of Airbag Deployment and Closing of Vent Control Valve

The airbag control unit 110 gives the inflator 111 a command to generate the deployment gas G and introduce the gas to the airbag 30 so as to start deploying the airbag 30.

In this step, to quickly deploy the airbag 30, the airbag control unit 110 switches the vent control valve 112 to a closed state.

Then, the process proceeds to step S03.

Step S03: Pre-Crash Brake Operation

In response to establishment of a pre-crash determination, the braking control unit 130 causes the hydraulic control unit 131 to generate a wheel cylinder hydraulic pressure in each wheel and to start braking or decelerating the vehicle 1 by the service brake.

This braking may be continued until the vehicle 1 stops, for example.

Then, the process proceeds to step S04.

Step S04: Airbag Deployment Completion Determination

Based on an output from the pressure sensor 113, for example, the airbag control unit 110 determines whether the airbag 30 has been deployed to a predetermined volume.

When the airbag control unit 110 determines that the airbag 30 has been deployed to the predetermined volume, the airbag control unit 110 regards the deployment of the airbag 30 as completed, and the process proceeds to step S05, and otherwise repeats step S04.

Step S05: Opening of Vent Control Valve

The airbag control unit 110 gives the vent control valve 112 a command to open the vent hole 31.

Thus, when the collision occurs, and as the collision object (pedestrian or the like) presses the airbag 30, the airbag 30 is accordingly contracted while discharging the deployment gas G from the vent hole 31 so as to absorb energy generated by the collision.

Then, the process proceeds to step S06.

Step S06: Initial Energy Absorption (EA) Completion Determination

Based on a change in internal pressure of the airbag 30 detected by the pressure sensor 113, for example, the airbag control unit 110 detects a contraction state of the airbag 30 and determines whether predetermined initial energy absorption by the airbag 30 is completed.

A contraction state of the airbag 30 that is determined as a completion of the initial energy absorption may be set, for example, considering that when the vent control valve 112 closes the vent hole 31 and increases the internal pressure of the airbag 30 to press the pedestrian or the like forward of the vehicle, the pedestrian or the like will not be notably injured and will be prevented from being thrown forward of the vehicle due to a repulsion force of the airbag 30.

When the airbag 30 is contracted to such a degree that it can be determined that the initial energy absorption is completed, the process proceeds to step S07, and otherwise repeats step S06.

Step S07: Closing of Vent Control Valve

The airbag control unit 110 gives the vent control valve 112 a command to close the vent hole 31.

Thus, the airbag 30 is pressed by the pedestrian or the like and increased in internal pressure.

In this step, when the internal pressure of the airbag 30 detected by the pressure sensor 113 is equal to or less than a predetermined value, the multi-stage inflator 111 additionally supply the deployment gas G and increases the internal pressure of the airbag 30.

Then, the process proceeds to step S08.

Step S08: Collision Object-Vehicle Body Relative Speed Determination

The environment recognition unit 120 detects a behavior of the collision object relative to the vehicle 1 (in particular, a speed relative to the vehicle body) using the stereo camera device 121, for example.

The airbag control unit 110 determines whether the speed of the collision object relative to the vehicle body that has been detected by the environment recognition unit 120 is equal to or less than a preset threshold.

When the relative speed is equal to or less than the threshold (typically, immediately before a ground speed of the collision object becomes equal to a traveling speed of the vehicle 1), the process proceeds to step S09, and otherwise repeats step S08.

Step S09: Opening of Vent Control Valve

The airbag control unit 110 gives the vent control valve 112 a command to open the vent hole 31.

Thus, the airbag 30 is contracted while discharging the deployment gas G from the vent hole 31.

Then, the process ends.

A description will now be made on state changes, functions, and effects of the airbag apparatus according to the embodiment during a collision with a pedestrian.

First, when a pre-crash determination with a pedestrian or the like is established, the airbag 30 is deployed to a state illustrated in FIGS. 1 and 2.

After the airbag 30 is deployed to this state, the vent hole 31 is opened by the vent control valve 112.

Figure 5:
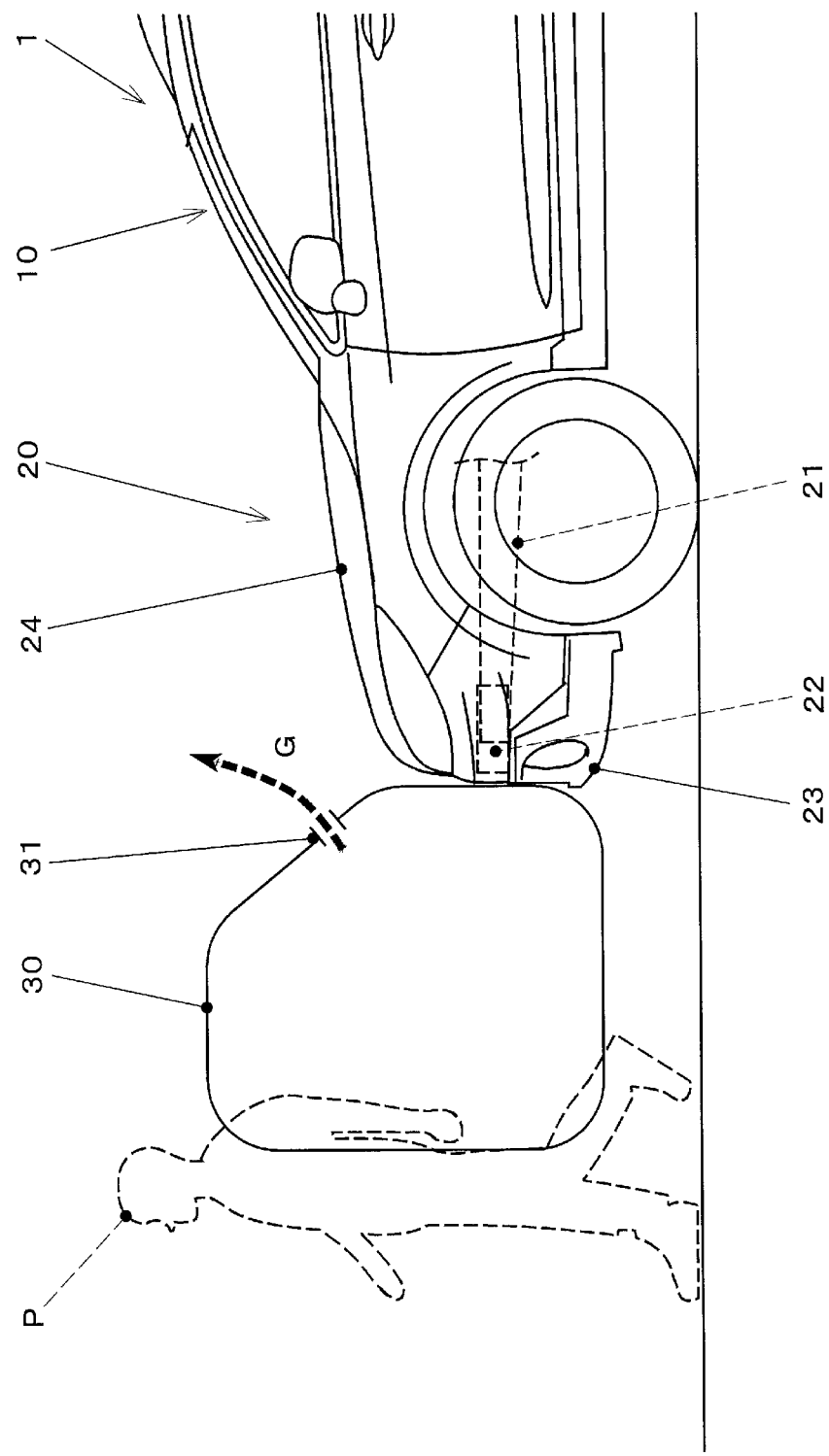
FIG. 5 is a diagram schematically illustrating a state immediately after a vehicle including the airbag apparatus according to the embodiment has collided with a pedestrian.

FIG. 5 is a diagram schematically illustrating a state immediately after a vehicle including the airbag apparatus according to the embodiment has collided with a pedestrian.

At an early stage of the collision, a pedestrian P is collided with, and the airbag 30 is pressed by the pedestrian P so that part of the deployment gas G inside the airbag 30 is discharged outside from the vent hole 31.

Consequently, while being contracted, the airbag 30 absorbs part of the collision energy input by the pedestrian P.

Subsequently, when the predetermined initial energy absorption is determined to be completed, the vent hole 31 is closed by the vent control valve 112.

Figure 6:
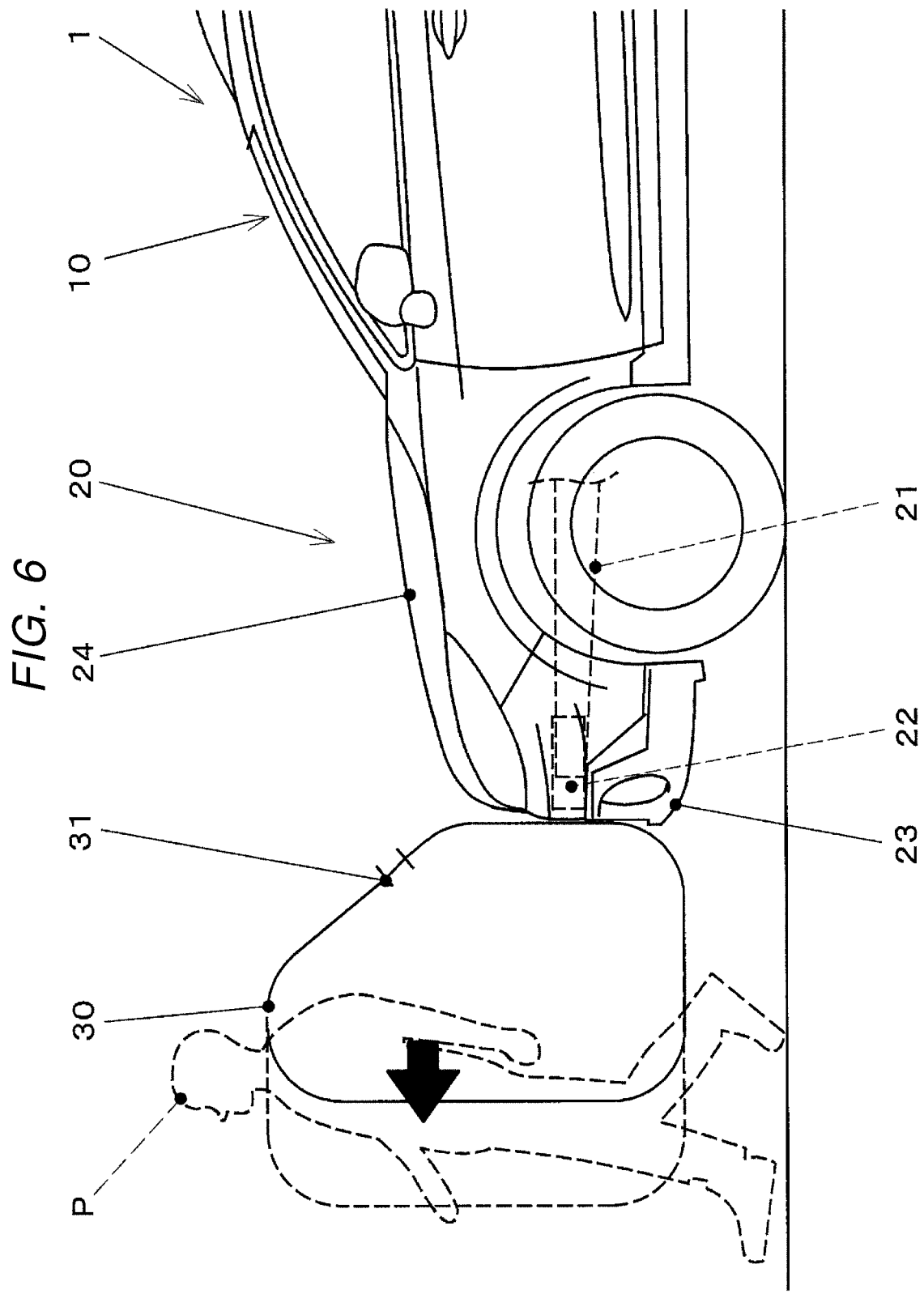
FIG. 6 is a diagram illustrating a state immediately after a vehicle including the airbag apparatus according to the embodiment has collided with a pedestrian and completed energy absorption.

FIG. 6 is a diagram illustrating a state immediately after a vehicle including the airbag apparatus according to the embodiment has collided with a pedestrian and completed energy absorption.

In FIG. 6, a contour of the airbag 30 before contraction is indicated by a dashed line.

In this state, the vent hole 31 is closed by the vent control valve 112. As necessary, the inflator 111 additionally supplies the deployment gas G and increases the internal pressure of the airbag 30.

The airbag 30 presses the pedestrian P forward of the vehicle and accelerates a ground speed of the pedestrian P.

Meanwhile, because the vehicle 1 is decelerated by pro-crash brake control, the relative speed of the pedestrian P and the vehicle body in this state gradually decreases.

Subsequently, when the relative speed is equal to or less than the predetermined threshold, the vent hole 31 is opened by the vent control valve 112.

FIG. 7 is a diagram illustrating a state after a vehicle including the airbag apparatus according to the embodiment has collided with a pedestrian, and a relative speed of the pedestrian and a vehicle body has become equal to or less than a predetermined threshold.

By opening the vent hole 31, the airbag 30 is contracted while discharging the deployment gas G from the vent hole 31.

Consequently, the pedestrian P leans on the vehicle body and is raised up onto the front hood 24.

As has been described heretofore, this embodiment can produce the following effects.

1. At an early stage of the collision with the collision object such as the pedestrian P or the like, the vent hole 31 is opened so that the airbag 30 is contracted while discharging the deployment gas G from the vent hole 31 so as to effectively perform energy absorption.

Subsequently, in response to a completion of the predetermined initial energy absorption, the vent hole 31 is closed to increase the internal pressure of the airbag 30 so as to press and accelerate the pedestrian P or the like forward and decrease the relative speed of the pedestrian P or the like and the vehicle body, thereby preventing injury of the pedestrian P or the like.

2. After the relative speed of the pedestrian P or the like and the vehicle body decreases to be low enough, the vent hole 31 is opened to decrease the internal pressure of the airbag 30 and soften the airbag 30 so as to guide the pedestrian P or the like to lean on the vehicle body or to be raised up onto the front hood 24 of the vehicle body.

3. When the pedestrian P or the like is pressed and accelerated forward by the airbag 30, the inflator 111 additionally supplies the deployment gas G so that an effect of increasing the internal pressure of the airbag 30 and accelerating the collision object can be enhanced to promote the above-described effects.

4. After a pre-crash determination is established, the vent hole 31 is closed until deployment of the airbag 30 is completed, thereby preventing the deployment gas G from flowing out during the deployment of the airbag 30, and quickly completing the deployment of the airbag 30.

Modifications

The disclosure is not to be limited to the above-described embodiment but may be modified in various manners. Such modifications will also fall within the technical scope of the disclosure.

1. The configurations of the airbag apparatus and the vehicle are not to be limited to those of the above-described embodiment but may be modified as suited.

For example, a configuration, shape, material, manufacturing method, location, and the number of each kind of components that constitute the airbag apparatus and the vehicle, and details of various kinds of control are not to be limited to those of the embodiment but may be modified as suited.

2. A method of performing a pre-crash determination and a method of discriminating a collision mode are not to be limited to those in the above-described embodiment but may be modified as suited.

3. In the embodiment, the completion of the predetermined energy absorption by the airbag is determined based on the internal pressure of the airbag. However, this is not to be construed in a limiting sense but other methods may be used to make the determination. For example, based on a contraction stroke of the airbag after occurrence of the collision or elapsed time after the occurrence of the collision, the completion of the predetermined energy absorption may be determined. For example, a behavior of the collision object after the collision with the airbag may be monitored to recognize an energy absorption state.

4. In the embodiment, after the collision, control is performed to switch the vent passage (vent hole) to an opened state or a closed state successively. However, this is not to be construed in a limiting sense. For example, while the vent passage is kept opened, the opening degree may be increased or decreased. For example, instead of closing the vent passage, the opening degree may be decreased while the vent passage is kept opened.

The airbag apparatus according to the embodiment of the disclosure includes the airbag, the collision determiner, the airbag deployment controller, the vent controller, and the energy absorption state detector. The airbag is configured to be deployed forward of the front of the vehicle body of the vehicle. The collision determiner is configured to establish a pre-crash determination when a collision probability is equal to or higher than the predetermined threshold. The airbag deployment controller is configured to, in response to the pre-crash determination, give the inflator a command to supply deployment gas to the airbag and deploy the airbag. The vent controller is configured to open and close the vent passage configured to discharge the deployment gas from the airbag. The energy absorption state detector is configured to detect a state of energy absorption by the airbag. The vent controller is configured to open the vent passage at an early stage of collision with a collision object, and subsequently, reduce an opening degree of the vent passage when the energy absorption state detector detects a completion of the predetermined energy absorption.

With this configuration, at an early stage of the collision with the collision object (typically, a human body of a pedestrian, a bicyclist, or the like), the vent passage is opened so that the airbag is contracted while discharging the deployment gas via the vent passage so as to effectively perform energy absorption.

Subsequently, in response to the completion of the predetermined energy absorption, the opening degree of the vent passage is reduced to increase the internal pressure of the airbag so as to press and accelerate the collision object forward and decrease the relative speed of the collision object and the vehicle body, thereby preventing injury of the collision object.

It is noted that in this specification and the claims, reduction of the opening degree of the vent passage includes completely closing the vent passage, and not quite closing but making the opening degree smaller than that in a preceding state.

In the embodiment of the disclosure, the airbag apparatus may further include the relative speed detector configured to detect a relative speed of the collision object and the vehicle body. The vent controller may be configured to increase the opening degree of the vent passage when the relative speed becomes equal to or less than the predetermined threshold, after the vent controller reduces the opening degree of the vent passage in response to the completion of the predetermined energy absorption.

With this configuration, after the relative speed of the collision object and the vehicle body decreases to be low enough, the vent passage can be opened to decrease the internal pressure of the airbag and soften the airbag so as to guide the collision object to lean on the vehicle body or to be raised up onto the hood of the vehicle body.

In the embodiment of the disclosure, the inflator may be configured to additionally supply the deployment gas into the airbag, after the vent controller reduces the opening degree of the vent passage in response to the completion of the predetermined energy absorption.

With this configuration, the effect of increasing the internal pressure of the airbag and accelerating the collision object can be enhanced to promote the above-described effects.

In the embodiment of the disclosure, the vent controller may be configured to make the opening degree of the vent passage smaller than an opening degree at the early stage of collision, until deployment of the airbag is completed, after establishment of the pre-crash determination.

Typically, until deployment of the airbag is completed, the vent passage may be closed.

With this configuration, the opening degree of the vent passage is reduced to prevent the deployment gas from flowing out during the deployment of the airbag, thereby quickly completing the deployment of the airbag.

As has been described heretofore, according to the embodiment of the disclosure, it is possible to provide the airbag apparatus that can prevent injury to a pedestrian or the like.

The airbag control unit 110, the environment recognition unit 120, and the braking control unit 130 illustrated in FIG. 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control unit 110, the environment recognition unit 120, and the braking control unit 130 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control unit 110, the environment recognition unit 120, and the braking control unit 130 illustrated in FIG. 3.

The invention claimed is:

1. An airbag apparatus to be applied to a vehicle, the airbag apparatus comprising:
    an airbag configured to be deployed forward of a front of a vehicle body of the vehicle;
    a collision determiner configured to establish a pre-crash determination in a case where a collision probability is equal to or higher than a predetermined threshold;
    an airbag deployment controller configured to, in response to the pre-crash determination, give to an inflator a command to supply deployment gas to the airbag and deploy the airbag;
    a vent controller configured to open and close a vent passage configured to discharge the deployment gas from the airbag; and
    an energy absorption state detector configured to detect a state of energy absorption by the airbag,
    wherein the vent controller is configured to open the vent passage at an early stage of collision with a collision object, and subsequently, reduce an opening degree of the vent passage in a case where the energy absorption state detector detects a completion of predetermined energy absorption.

2. The airbag apparatus according to claim 1, further comprising a relative speed detector configured to detect a relative speed of the collision object and the vehicle body,
    wherein the vent controller is configured to increase the opening degree of the vent passage in a case where the relative speed becomes equal to or less than a predetermined threshold, after the vent controller reduces the opening degree of the vent passage in response to the completion of the predetermined energy absorption.

3. The airbag apparatus according to claim 1, wherein the inflator is configured to additionally supply the deployment gas into the airbag, after the vent controller reduces the opening degree of the vent passage in response to the completion of the predetermined energy absorption.

4. The airbag apparatus according to claim 2, wherein the inflator is configured to additionally supply the deployment gas into the airbag, after the vent controller reduces the opening degree of the vent passage in response to the completion of the predetermined energy absorption.

5. The airbag apparatus according to claim 1, wherein the vent controller is configured to make the opening degree of the vent passage smaller than at the early stage of collision, until the airbag is completely deployed, after establishment of the pre-crash determination.

6. The airbag apparatus according to claim 2, wherein the vent controller is configured to make the opening degree of the vent passage smaller than at the early stage of collision, until the airbag is completely deployed, after establishment of the pre-crash determination.

7. The airbag apparatus according to claim 3, wherein the vent controller is configured to make the opening degree of the vent passage smaller than at the early stage of collision, until the airbag is completely deployed, after establishment of the pre-crash determination.

8. The airbag apparatus according to claim 4, wherein the vent controller is configured to make the opening degree of the vent passage smaller than at the early stage of collision, until the airbag is completely deployed, after establishment of the pre-crash determination.

9. An airbag apparatus to be applied to a vehicle, the airbag apparatus comprising:
    an airbag configured to be deployed forward of a front of a vehicle body of the vehicle; and
    circuitry configured to
        establish a pre-crash determination in a case where a collision probability is equal to or higher than a predetermined threshold
        based on the pre-crash determination, give to an inflator a command to supply deployment gas to the airbag and deploy the airbag
        open and close a vent passage configured to discharge the deployment gas from the airbag; and
        detect a state of energy absorption by the airbag,
    wherein the circuitry is configured to open the vent passage at an early stage of collision with a collision object, and subsequently, reduce an opening degree of the vent passage upon detecting a completion of predetermined energy absorption.

10. The airbag apparatus according to claim 1, wherein a vent controller is configured to open the vent passage at the early stage of collision with the collision object, and subsequently, reduce an opening degree of the vent passage upon detecting the completion of predetermined energy absorption.

11. The vehicle comprising the airbag apparatus according to claim 1.

12. A computer readable medium including computer instructions executable by a processor for an airbag apparatus to be applied to a vehicle, the airbag apparatus including an airbag configured to be deployed forward of a front of a vehicle body of the vehicle, the computer readable medium comprising the computer instructions configured to:

establish a pre-crash determination in a case where a collision probability is equal to or higher than a predetermined threshold;

in response to the pre-crash determination, give to an inflator a command to supply deployment gas to the airbag and deploy the airbag;

open and close a vent passage configured to discharge the deployment gas from the airbag; and detect a state of energy absorption by the airbag, wherein the computer instructions are configured to open the vent passage at an early stage of collision with a collision object, and subsequently, reduce an opening degree of the vent passage in a case where an energy absorption state detector detects a completion of predetermined energy absorption.

13. The computer readable medium according to claim 12, further comprising a relative speed detector configured to detect a relative speed of the collision object and the vehicle body, wherein a vent controller is configured to increase the opening degree of the vent passage in a case where the relative speed becomes equal to or less than a predetermined threshold, after the vent controller reduces the opening degree of the vent passage in response to the completion of the predetermined energy absorption.

14. The computer readable medium according to claim 12, wherein the inflator is configured to additionally supply the deployment gas into the airbag, after a vent controller reduces the opening degree of the vent passage in response to the completion of the predetermined energy absorption.

15. The computer readable medium according to claim 13, wherein the inflator is configured to additionally supply the deployment gas into the airbag, after the vent controller reduces the opening degree of the vent passage in response to the completion of the predetermined energy absorption.

16. The computer readable medium according to claim 12, wherein a vent controller is configured to make the opening degree of the vent passage smaller than at the early stage of collision, until the airbag is completely deployed, after establishment of the pre-crash determination.

17. The computer readable medium according to claim 13, wherein the vent controller is configured to make the opening degree of the vent passage smaller than at the early stage of collision, until the airbag is completely deployed, after establishment of the pre-crash determination.

18. The computer readable medium according to claim 14, wherein the vent controller is configured to make the opening degree of the vent passage smaller than at the early stage of collision, until the airbag is completely deployed, after establishment of the pre-crash determination.

19. The computer readable medium according to claim 15, wherein the vent controller is configured to make the opening degree of the vent passage smaller than at the early stage of collision, until the airbag is completely deployed, after establishment of the pre-crash determination.

20. The computer readable medium according to claim 12, wherein a vent controller is configured to open the vent passage at the early stage of collision with the collision object, and subsequently, reduce an opening degree of the vent passage upon detecting the completion of predetermined energy absorption.

\* \* \* \* \*